(12) United States Patent
Bottomley et al.

(10) Patent No.: US 6,941,199 B1
(45) Date of Patent: Sep. 6, 2005

(54) ROBOTIC SYSTEM

(75) Inventors: Ian Bottomley, Northumberland (GB); David Coates, Northumberland (GB); Andrew Russell Graydon, Newcastle-upon-Tyne (GB); David McCrory Jamieson, Northumberland (GB); Claude Paul Mancel, Waterloo (BE); Barry Stoddart, Gateshead (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/743,933

(22) PCT Filed: Jul. 16, 1999

(86) PCT No.: PCT/US99/16078

§ 371 (c)(1),
(2), (4) Date: Feb. 14, 2001

(87) PCT Pub. No.: WO00/04430

PCT Pub. Date: Jan. 27, 2000

(30) Foreign Application Priority Data

Jul. 20, 1998 (EP) .................................. 98305761

(51) Int. Cl.$^7$ ............................................. G05D 1/02
(52) U.S. Cl. ........................ 701/23; 701/301; 318/587
(58) Field of Search .............................. 701/22, 23, 27, 701/301; 318/568.12, 580, 587; 706/904, 706/905; 901/1; 180/167, 168, 169; 15/319, 15/320

(56) References Cited

U.S. PATENT DOCUMENTS

| 367,420 A | 8/1887 | Luchs |
|---|---|---|
| 2,770,074 A | 11/1956 | Jones et al. |
| 3,088,157 A | 5/1963 | Aguilar |
| 3,952,361 A | 4/1976 | Wilkins |
| 3,963,096 A | 6/1976 | Jones |
| 4,114,711 A | 9/1978 | Wilkins |
| 4,161,793 A | 7/1979 | Merchan |
| 4,306,329 A | 12/1981 | Yokoi |
| 4,515,235 A | 5/1985 | Yamamoto et al. |
| 4,674,048 A | 6/1987 | Okumura |
| 4,700,427 A | 10/1987 | Knepper |
| 4,702,718 A | 10/1987 | Yanase |
| 4,782,550 A | 11/1988 | Jacobs |
| 4,933,864 A | 6/1990 | Evans, Jr. et al. |
| 4,977,639 A | 12/1990 | Takahashi et al. |

(Continued)

FOREIGN PATENT DOCUMENTS

DE          3536974          4/1987

(Continued)

OTHER PUBLICATIONS

Sekiguchi et al.; A Mobile Robot By Multi-Hierarchical Neural Network; IEEE, Conf. on Robotics and Automation; May 1989; vol. 3, pp. 1578-1583.*

(Continued)

Primary Examiner—Michael J. Zanelli (57) ABSTRACT

A self-propelled robot is disclosed for movement over a surface to be treated. The robot has a power supply and a pair of wheels driven by motors for moving the robot over the surface. A mechanism is provided for controllably depositing a fluent material on to the surface. Navigation sensors provide signals for enabling the robot to navigate over the surface and one or more detectors detect the presence of the material on the surface and provide signals indicative of its presence. A control system receives the signals from the sensors and detectors and controls the motors and the depositing mechanism in dependence upon the signals received from the sensors and detectors.

14 Claims, 3 Drawing Sheets

U.S. PATENT DOCUMENTS

| | | | |
|---|---|---|---|
| 5,012,886 | A | 5/1991 | Jonas et al. |
| 5,109,566 | A | 5/1992 | Kobayashi et al. |
| 5,155,684 | A | 10/1992 | Burke et al. |
| 5,279,672 | A | 1/1994 | Betker et al. |
| 5,293,955 | A | 3/1994 | Lee |
| 5,341,540 | A | 8/1994 | Soupert et al. |
| 5,440,216 | A | 8/1995 | Kim |
| 5,451,014 | A | 9/1995 | Dare et al. |
| 5,453,931 | A * | 9/1995 | Watts, Jr. .................... 180/168 |
| 5,613,261 | A * | 3/1997 | Kawakami et al. ........... 15/319 |
| 5,622,236 | A | 4/1997 | Azumi et al. |
| 5,636,402 | A | 6/1997 | Kubo et al. |
| 5,787,545 | A | 8/1998 | Colens |
| 5,815,880 | A * | 10/1998 | Nakanishi .................... 15/319 |
| 5,883,861 | A | 3/1999 | Moser et al. |
| 5,894,621 | A | 4/1999 | Kubo |
| 5,903,124 | A | 5/1999 | Kawakami |
| 5,904,196 | A | 5/1999 | Wickers |
| 5,917,442 | A | 6/1999 | Manoogian |
| 5,919,078 | A | 7/1999 | Cassidy |
| 5,940,927 | A | 8/1999 | Haegermarck et al. |
| 5,942,869 | A | 8/1999 | Katou et al. |
| 5,943,009 | A | 8/1999 | Abbott |
| 5,974,347 | A | 10/1999 | Nelson |
| 5,988,306 | A | 11/1999 | Ooishi |
| 5,998,953 | A * | 12/1999 | Nakamura et al. ........... 15/49.1 |
| 5,999,866 | A | 12/1999 | Kelly et al. |
| 6,076,025 | A | 6/2000 | Ueno et al. |
| 6,076,226 | A | 6/2000 | Reed |
| 6,119,057 | A | 9/2000 | Kawagoe |
| 6,124,694 | A * | 9/2000 | Bancroft et al. ............. 15/319 |

FOREIGN PATENT DOCUMENTS

| | | | |
|---|---|---|---|
| DE | 3536974 | A * | 4/1987 |
| EP | 0786229 | | 7/1997 |
| FR | 234 047 | | 4/1977 |
| WO | WO 90/14788 | | 12/1990 |
| WO | WO 97/02075 | | 1/1997 |
| WO | WO 00/04430 | | 1/2000 |

OTHER PUBLICATIONS

U.S. Appl. No. 09/715,307, filed Nov. 17, 2000, Bartsch et al.

U.S. Appl. No. 09/580,083, filed May 30, 2000, Kirkpatrick et al.

U.S. Appl. No. 09/917,348, filed Jul. 24, 1999, Bottomley et al.

Japanese Patent Application Hei 9-36 4773, Ueno Ichiro et al., Dec. 22, 1977.

Japanese Patent Application Hei 9-36 4774, Kato Hironobu et al., Dec. 22, 1977.

WO 9917348.6 Bottomley et al, Jul. 24, 1999.

Sekiguchi, M. et al *"Behavior Control For A Mobile Robot By Multi-Hierarchical Neural Network"* Proceedings of the International Conference on Robotics and Automation, Scottsdale, May 15-19, 1989, vol. 3.

Holenstein, A. et al *"Collision Avoidance in a Behavior-Based Mobile Robot Design"* Proceedings of the International Conference on Robotics and Automation, Sacramento, Apr. 9-11, 1991, vol. 1.

Fei Yue Wang et al *"A Petri-Net Coordination Model for an Intelligent Mobile Robot"* IEEE Transactions on Systems, Man and Cybernetics, vol. 21, No. 4, Jul. 1, 1991.

Hinkel R., et al, *"An Application for a Distributed Computer Architecture-Realtime Data Processing in an Autonomous Mobile Robot"* International Conference on Distributed Computing Systems, San Jose, Jun. 13-17, 1988, No. 1988, Jun. 13, 1988.

EPO Application No. 98305761.3, The Procter & Gamble Company, Jul. 20, 1998.

* cited by examiner

ROBOTIC SYSTEM

TECHNICAL FIELD

The present invention relates to robotic systems and, more particularly to a mobile robotic system capable of movement over a surface and capable of treating the surface.

BACKGROUND OF THE INVENTION

Conventionally robotic systems, or robots, of this type may be described as semi-autonomous, i.e. self-propelling but relying for navigational guidance on transmitters, receivers and sensors to establish a coordinate system by which the robot navigates, in effect learning the location of obstacles within its field of movement. More recently it has been proposed to allow a robot to move without establishing a coordinate system, instead relying on the sensing of ad hoc stimuli to enable the robot to navigate around obstacles. For example, it has been proposed to provide a robotic vacuum cleaner operating along these lines. Self-navigational robotic systems of this type are referred to as autonomous robots.

However, robots of these types, often intended for operation in a domestic environment, need a control system which is capable of allowing the robot to move around its environment in safety and therefore additionally need some sort of collision detection system which is capable of providing information on collisions or impending collisions to a control system capable of acting very quickly to prevent the collision or else to minimise the impact, and to perform collision avoidance by re-orienting the robot before further movement. Unfortunately, on-board processing power is inevitably limited by cost constraints in particular and therefore present systems, to avoid be prohibitively expensive, have relatively limiting navigational abilities which result, in use, in the robot tracing a path which involves passing over the same areas of the surface on plural occasions. Whilst this may not be problematic in say a vacuum cleaner, if the robot has the function of treating the surface in other ways, then such redundant movement may result in over-treatment of the surface which is not only wasteful of the product used for the treatment (a serious problem where the payload is restricted), but may also damage the surface or otherwise actually be harmful.

SUMMARY OF THE INVENTION

The present invention is aimed at providing a self-propelled robot which can overcome such problems.

According to the present invention, there is provided a self-propelled robot for movement over a surface to be treated, the robot comprising
  a power supply;
  a traction mechanism receiving power from the power supply, for moving the robot over the surface;
  a mechanism for controllably depositing a fluent material on to the surface;
  a plurality of navigation sensors providing signals for enabling the robot to navigate over the surface;
  one or more detectors adapted to detect the presence of the material on the surface and provide signals indicative thereof; and
  a control system receiving the signals from the sensors and detectors, for controlling the traction mechanism and the depositing mechanism in dependence upon the signals received from the sensors and detectors.

By detecting the application of the fluent material, which may be a liquid or gaseous fluid or else a flowable powder, the over-application of material can be avoided or minimised by either navigating the robot around areas already treated and/or by controlling the depositing mechanism to stop the deposit of material over such previously treated areas.

Material for treatment is preferably contained within a reservoir on the robot and may comprise suitable compositions for treatment of floors, carpets and other floor coverings. The robot may, if desired, also include means for cleaning the floor or floor covering prior to treatment, for example in the form of a vacuum cleaning device.

The invention also includes a method of treating a surface using a robot as defined above. The treatment method may be used for various applications on carpets, and other floor coverings, such as cleaning, protective treatment, for example for stain and soil protection, fire protection, UV protection, wear resistance, dust mite control, anti microbial treatment and the like, as well as treatment to provide an aesthetic benefit such as odorization/deodorization. The treatment method may also find application on other surfaces such as synthetic floor coverings, ceramics or wood. As well as polishing hard surfaces, the robot may also be used to apply coatings to either enhance aesthetics or to act as a protective layer.

Thus, according to a further aspect of the invention, there is provided a method for controllably depositing a fluent material on to floors, carpets and other floor coverings using an autonomous, self propelled, deposition-sensing robot. The material deposited may, for example, be a carpet cleaning composition, a hard surface cleaning composition, or one of a number of compositions applied simultaneously, or successively, and may include a marker, the presence of which can be detected to provide detection of the extent of treatment material deposition. Such a marker may have a limited detection life, for example, 12, 24 or 48 hours.

Non-visible treatment may also be provided by the robot of the invention, for example, for odour control, antibacterial action of dust mite control.

The robot preferably comprises a plurality of navigation sensors providing signals for enabling the robot to navigate over the surface, and one or more detectors adapted to detect the presence of the material on the surface and provide signals indicative thereof. The navigation sensors may include one or more collision sensors and/or proximity sensors. The collision sensors may include one or more lateral displacement sensors arranged on a peripheral sensor ring to provide 360° collision detection, and/or one or more vertical displacement sensors.

Utilising a generally circular shape together with a control regime which scans for the best direction of escape after the robot has become stuck (say in a corner) is especially advantageous. Furthermore, it may be additionally advantageous to detect the angle of any collision, in order to optimise the robots subsequent angle of movement away from the obstacle.

The traction mechanism preferably includes left and right, coaxially disposed drive wheels with corresponding drive motors which are preferably provided with pulse-width modulated drive signals.

For depositing material on the surface, an array of delivery ports, e.g. spray nozzles, may extend generally parallel with the drive wheel axis, preferably extending to the same lateral extent as the deposition detectors.

The detectors may comprise one or more sensors arranged to detect the edge of a section of previously deposited product. Suitable deposition detectors include one or more radiation sources and/or detectors, moisture detectors, reflectivity meters, conductivity meters etc. Detectors may be disposed laterally of the drive wheels, preferably forward thereof.

The robot further preferably comprises a control system for controlling deposition of the material dependent on the signals received from the one or more detectors and sensors. In preferred embodiments, the control system functions to control deposition of the material (e.g. to avoid or minimise over-application) by a combination of strategies comprising a) navigating the robot around previously-treated areas of the surface (referred to herein as the 'navigation strategy'; and b) controlling the depositing mechanism to stop or reduce the deposit of fluent material on to the surface as the robot passes over such previously-treated areas (referred to herein as the 'deposition rate control strategy'). In practice, the control system arbitrates between the two strategies depending on the signals received from the navigation sensors and deposition detectors. The ability of the control system to arbitrate between the two strategies, for example to make a rapid judgment on whether to cross or navigate around previously-treated areas and whether to maintain, reduce or stop deposition accordingly, is an important feature for ensuring controlled deposition in the context of a fully autonomous robot designed to operate in the cluttered, unstructured and track-free environment typically found in domestic and institutional situations.

Alternatively, the control system can be designed to control deposition purely following a deposition rate control strategy, in other words, by controlling the depositing mechanism to stop or reduce the deposit of fluent material on to the surface as the robot passes over previously-treated areas. Of course, systems depending purely on deposition rate control require less complicated electronics than the preferred combined-strategy systems described above. On the other hand, single strategy systems can be less efficient in terms of the time required to complete the task in hand.

Preferably, the control system has a hierarchical architecture and includes one or more microprocessor controllers or microcontrollers for controlling higher-level functions, and providing higher-level instructions and a plurality of lower-level function modules adapted to receive signals from the sensors and detectors and to provide control signals in response thereto. The traction mechanism and product dispensing control signals are preferably issued to a traction mechanism controller and to a product dispensing controller via a manifold or bus arranged to receive signal inputs from the microprocessor and a plurality of sub-processors each corresponding to a respective navigation sensor or the like. By this means, a distributed processing system can be employed to provide a high level of flexibility in control strategy, whilst allowing simple connection of the sub-processors, thus to reduce the complexity and expense of the control system. The various processors preferably include neural network functionality to provide behavioural characteristics appropriate to the chosen task of the robot, the behavioural characteristics of the processors preferably being moderated by a group of generic moderators providing necessary arbitration between the control instructions from the various processors. The higher-level functions preferably include one or more functions selected from determination of the robot being stuck, room size estimation, clutter level determination, and battery monitoring. The lower-level modules are preferably analog neural networks which provide, for example, edge follow and dispense control functions, together, preferably, with cliff sensing, collision detection, speed reduction and random movement functions.

BRIEF DESCRIPTION OF THE DRAWINGS

One example of a self-propelled robot constructed in accordance with the present invention, and its method of operation, will now be described with reference to the accompanying drawings in which:—

DETAILED DESCRIPTION OF THE EXEMPLARY EMBODIMENTS

Figure 1:
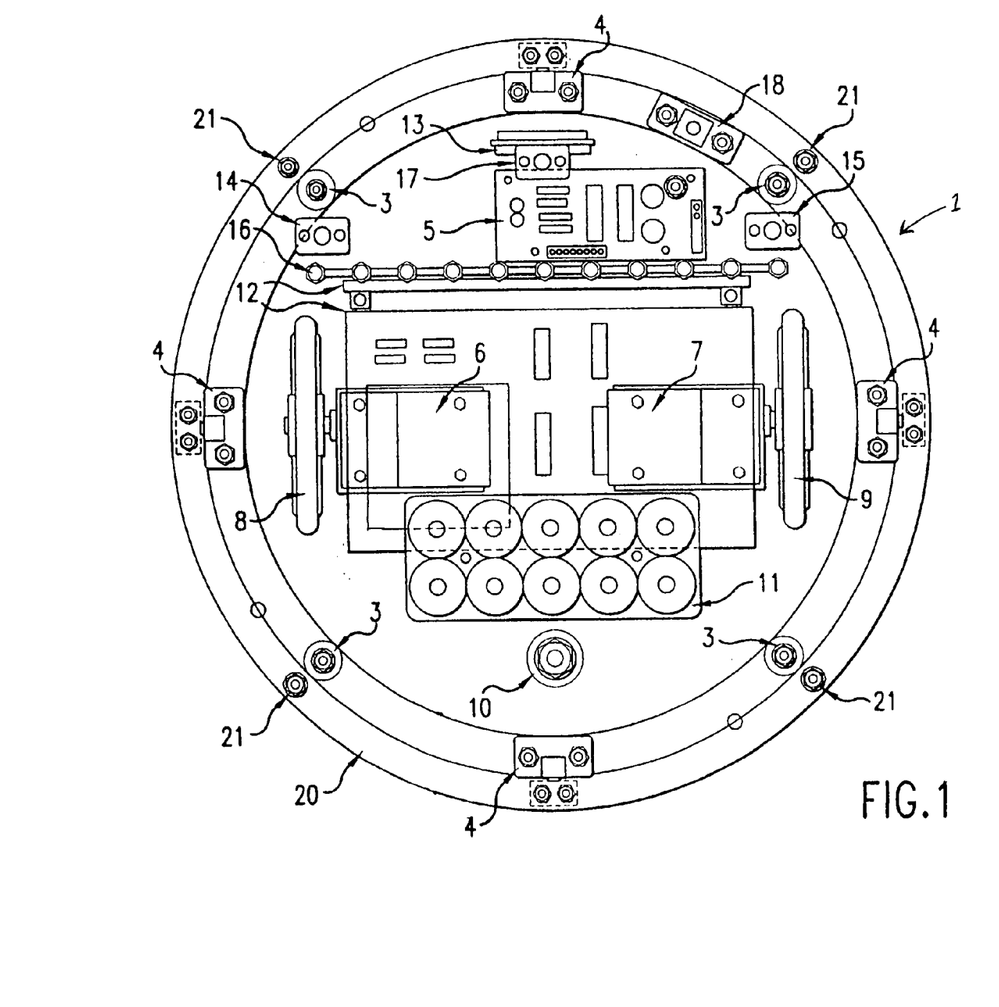
FIG. 1 is an underneath plan view of the robot.

As can be seen from FIG. 1, the robot of the present example is substantially circular in overall plan view. A simple plate-like chassis 1 supports both the mechanical and electrical components of the robot. The plate-like chassis 1 supports the body (not shown) of the robot on resilient rubber mountings 3 which allow the body to move relative to the chassis 1 when a force is applied, e.g. by collision with an object, to a sensor ring 20 which is disposed around the periphery of the body. Four displacement sensors 4 placed at 90° intervals around the robot measure lateral displacement of the body relative to the chassis 1 and inform the control system of contact with an external object. The displacement sensors 4 are based on linear Hall Effect devices which produce a voltage which is proportional to the strength of the magnetic field in which they are immersed. Each sensor consists of a small permanent magnet mounted on the body shell support ring 20 and a Hall Effect device mounted on the main chassis 1. When the body moves with respect to the chassis 1 (as happens during a collision) the voltage produced by the Hall Effect device varies and can be used to signal the control system that an object has been encountered. By examining the signals from all four sensors the angle and magnitude of the collision can be deduced. These sensors allow displacements in the order of 0.1 mm to be reliably detected. A fifth sensor 18, of the same type as the displacement sensors 4, measures vertical displacement of the body shell to accommodate forces produced by objects which are of insufficient height to cause lateral body movement. In an alternative construction, these sensors may be superseded by a single custom-built sensor which can measure lateral and vertical displacement simultaneously. Such an integrated sensor may be optical in nature utilizing an array of photo detectors mounted on the chassis and a light source which is mounted on the body support ring.

A single forward facing time-of-flight ultrasound sensor 13 is mounted at the front of the robot and is used to allow the robot to gather more information regarding its surroundings than can be achieved by the displacement sensors 4 alone. This ultrasound sensor 13 is based on a Polaroid® ranging module Polaroid 6500 series sonar ranging device, Polaroid reference 615077, the data from which is pre-processed by a dedicated unit 5 on which the sensor 13 is located. An ultrasonic sensor unit 5, containing the ultrasonic sensor 13 itself and a suitable electronic interface, are mounted on the body to provide proximity information to the robot's control system.

Left and right motors 6, 7 are provided to drive corresponding left and right wheels 8, 9 each with a soft rubber tyre, via an integral reduction gearbox, to provide motive power to the robot. A single castor 10 mounted at the rear of the robot completes the drive/movement system and allows the chassis to move forwards or backwards and rotate on the spot. Varying the rotational speed of the left and right motors 6, 7 allows the robot to be steered in any direction. The speed of the motors is controlled by pulse width modulating the voltages applied to the motors. This involves switching the motor current on and off very rapidly (100,000 times a second) and varying the ratio of 'on' time to 'off' time. This is a very efficient way to control the power to the motors and hence their speed.

Power for the robot, including the motors 6, 7 and the control system is provided by means of a battery pack 11 mounted on the chassis 1. To protect the components of the robot from tampering and from damage a cover or housing (not shown) is attached to the body to house the robot components. In the preferred embodiment, this is part-spherical or dome-like in shape.

A row of spray nozzles 16 and a pump 115 (not shown in FIG. 1) provide a means of dispensing treating fluid on to the surface to be treated and detectors 14,15,17 are provided to detect the presence of the treating fluid (or a suitable additional marker fluid). The three sensor units 14, 15, 17, one placed in front of each of the drive wheels and the third 17 placed centrally, emit light at a wavelength which excites a fluorescent dye in the product being detected. These sensor units incorporate a pair of light sensitive devices positioned at 90° to the robot's direction of travel and spaced 20 mm apart, which can detect light produced by the fluorescent dye. By examining the intensity of the light detected by these devices the edge of a section of previously deposited product can be detected and hence followed. In an alternative construction, the three sensor units 14, 15, 17 pass a small electrical current through the floor covering by virtue of an array of stainless steel contacts which are designed to glide over the floor covering surface. The conductivity of the floor covering will vary depending upon whether or not it has recently been sprayed with product. By examining the conductivity of the floor covering, the edge of previously deposited product can be detected and hence followed.

In an alternative construction, in which fluid is to be dispensed to an edge or corner, the positioning of the sprays is modified. The modification is such that the spray is able to dispense to the edge of the robot or beyond, for example, either by positioning nozzles at the very periphery of the underside or by additional nozzles which protrude from the casing and are directed such that they spray beyond the perimeter of the robot.

The robot's control system comprises various circuit boards and components which are not shown in FIG. 1 in detail, but which are broadly indicated by reference numerals 12 in FIG. 1.

The control system will now be described in further detail.

Two purposes of the control system of an autonomous mobile robot such as that of the example are to allow the robot to move within a physical environment in safety and to enable it to perform useful tasks. To do this the robot must be aware of its immediate surroundings and be able to react to particular circumstances in particular ways. A robot intended for an unconstrained domestic environment needs to have certain basic skills, such as a collision detection skill, which might cause it to stop upon collision with an object and then take evasive action before resuming its previous activity.

In the case of collision detection, the sensors 4, 18, 13, which sense impacts with and proximity to objects, will inform the control system of the angle of impact and its force. The control system must react very quickly to this stimulus and prevent any further motion in this direction. A conventional approach to this problem would be to have a computer monitor the collision sensors and act upon the data to stop the motors and then perform some form of avoidance manoeuvre. This is perfectly feasible, but if the same computer is required simultaneously to perform other tasks, for example, such as in the present case, monitoring other sensors and performing navigational mathematics, it soon reaches a point where the speed and power of the on-board computer required becomes prohibitively expensive if reaction times are to be acceptable.

The alternative, adopted in the present invention, is to use discrete modules that perform functions in a way analogous to the reflexes of a biological organism. The advantage of this system are obvious: the main processor can merely issue high level commands such as move or turn and is left free to perform other abstract tasks.

This alternative is a form of hierarchical distributed processing and allows the control system to be composed of simple modules that together yield faster response times than a non-distributed system of the same cost. Another significant advantage of distributed processing is its inherent robustness. If a system employing a conventional single processor approach suffers a failure, it can leave the system in an unsafe state, which in the case of a robot might allow it to crash into objects or people. The distributed approach can be designed so as to have a much greater degree of fault tolerance, rendering the occurrence of complete system failures much less likely.

Distributed processing can be implemented using conventional computers connected together by some form of network, but these tend to be expensive to design and implement. The approach adopted in the present invention is to simulate biological neural networks in real analogue hardware to provide a system that consists of behavioural modules, which are designed to perform individual tasks. These behaviours are managed by a simple micro controller, which performs higher level tasks such as mathematical functions to estimate room size or a strategy for escaping from under a table.

Figure 2:
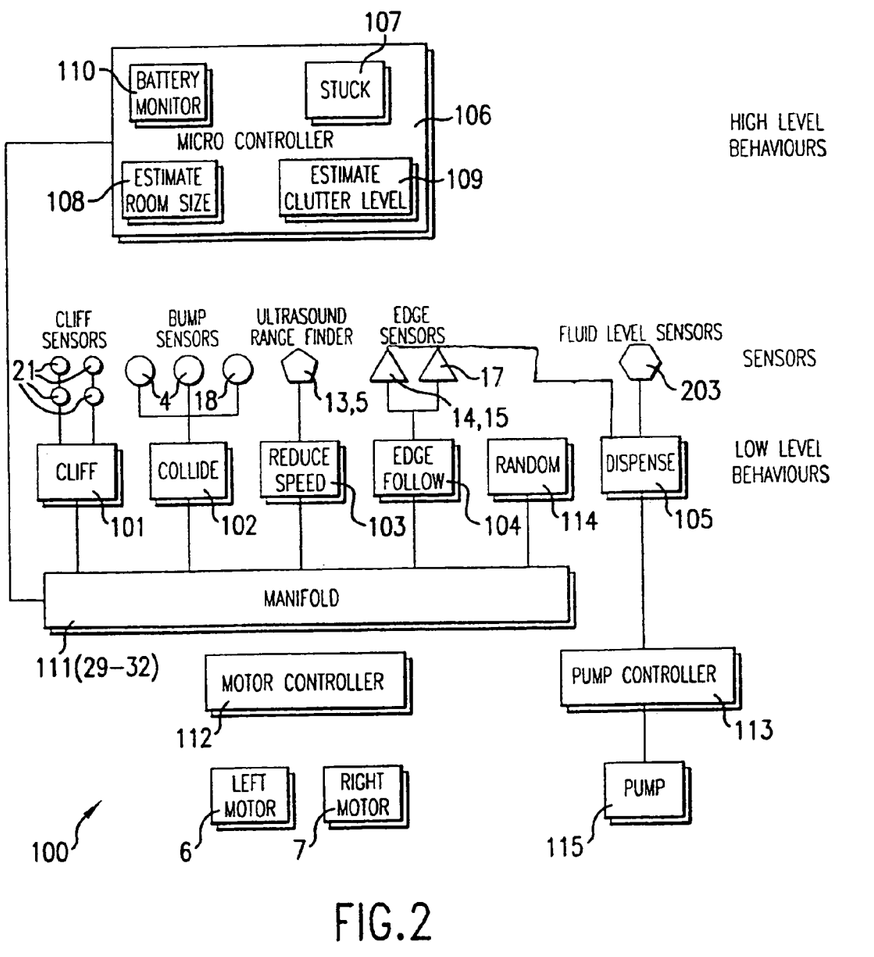
FIG. 2 is a functional diagram of the robot.
Figure 3A:
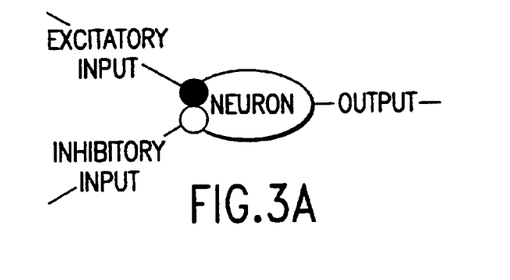
FIGS. 3A–C illustrate neural net aspects of part of the robot's control system.

The control system 100 will now be described with reference to FIGS. 2 and 3. FIG. 2 illustrates the functional relationship of the control system components.

The control behaviours used on the robot can be divided into two basic types, Low Level and High Level. Low Level behaviours are implemented in hardware as discrete neural blocks or modules 101–105, while High Level behaviours are software algorithms running on a micro controller 106.

The functions of the Low level behaviour modules 101–105 and 114 are now described in detail:—

Cliff—To prevent the robot falling down stairs it is equipped with four cliff detectors 21 which warn of vertical hazards and provide signals to the cliff behaviour module 101. The cliff detectors 21 are active infra red proximity sensors which comprise a modulated light source which emits a beam of infra red light directed at the target (in this case the floor), and an infra red detector which monitors the intensity of the light which is reflected. When the sensor is directed over a cliff the intensity of the reflected light decreases and the sensor informs the control system of the hazard. This behavioural function has very high priority and when active operates to manoeuvre the robot away from the hazard and return it to a course which is modified to avoid cliff type drops.

Edge Follow—The Edge Follow module 104 provides a behavioural function which uses information from the sensors 14,15,17 which allow the robot to find the edge of a previously treated area (as described above) and to travel along that edge to produce a faster scan of the floor surface.

Random—In the absence of any edges the robot moves in a random direction under the action of a random movement module 114 until an object is encountered or the edge follow behaviour is activated.

Collide—The collision detection module 102 takes input from the displacement sensors 4,18 and operates so that upon encountering an obstacle the robot stops, reverses a small distance, then turns away from the object in a direction that depends upon the angle of impact, which is determined from the signals of the displacement sensors 4,18.

Reduce Speed—When an object is detected by the ultrasound sensor unit 5 within a pre-set range limit, the forward speed of the robot is reduced by the Reduce Speed module 103 to minimise the impact force generated when contact with the object occurs.

Dispense—A dispense control module 105 has inputs from a fluid level sensor 203 and sensors 14, 15, 17 via the Edge Follow module 104. If the UV sensors 14, 15, 17 report untreated carpet in the direction of travel the treatment chemical is dispensed until treated areas are encountered or fluid level reaches a lower limit.

High level behaviours are determined within the microcontroller 106 and comprise the following functional modules:—

Stuck—A routine 107 determines if there have been more than a chosen number of collisions in a select period and causes the robot to stop and use the ultrasound range finder 5, 13 to find the longest clear path and move in that direction. The robot will rotate on the spot, by operating the wheels 8, 9 in opposite directions, looking for the longest clear path. When the best direction is discovered the robot will move off in that direction.

Estimate Room size—By using statistics gathered from the ultrasound sensor 13 and measuring the time between collisions the routine 108 is able to estimate the area of the room. This is used to determine how long the robot should take to treat a particular room.

Estimate clutter level—By comparing estimates of room size against collisions per minute a routine 109 is able to deduce a factor describing the complexity of the room. This can then be used to modify the run time to allow for the level of clutter.

Battery Monitor—A battery monitor routine 110 checks the state of the battery by monitoring the output voltage and current. It uses this information to estimate how long the battery will be able to support the robot's systems before a re-charge is needed. When the monitor routine decides that the battery state is approaching the point where reliable operation is no longer possible, the user is warned by illumination of a battery low indicator. If the robot is allowed to continue to operate without being re-charged the monitor routine will shut the robot down in a safe and controlled fashion when power levels reach a predetermined point. Nickel Cadmium or Nickel Metal Hydride batteries require careful charging to ensure maximum capacity and life span and the monitor routine also controls the charging cycle of the battery to ensure that these needs are met.

Traditionally neural network designers have insisted that every neuron in a network is connected to every other neuron in that network. Whilst this allows the network the greatest level of flexibility, very many (even as high as 90%) of these connections will never be used. The present system allows pre-configured neural networks to be connected together in a much less complex way allowing the behaviour of the robot to dynamically adjust to the immediate environment in a continuous fashion.

This so-called "Manifold Architecture" comprises an analogue bus or manifold 111, connecting all the behaviour modules 101–105 and their associated actuators to each other. Four generic moderators arbitrate between the behaviours, and give rise to a prototype behaviour of their own which regulates the overall activity of the robot via a motor controller 112 and dispensing fluid pump controller 113 driving the pump 115. These generic moderators sum all the excitatory and inhibitory inputs and apply a non-linear transfer function to the results. The outputs from these moderators form the inputs to the motor controllers.

In order to explain the function of the manifold architecture, it is necessary to describe the basic neural aspects of the control system. FIGS. 3A–C will be referenced for this purpose.

A single neuron (see FIG. 3A) has three basic types of connections, excitatory inputs which cause the neuron to 'fire', inhibitory inputs which suppress activity and the output which represents the state of the neuron. Additionally neurons may have other properties such as Decay which causes the output to fall slowly over time, and Threshold which suppresses all output until the sum of all the input exceeds a certain level.

Figure 3B:
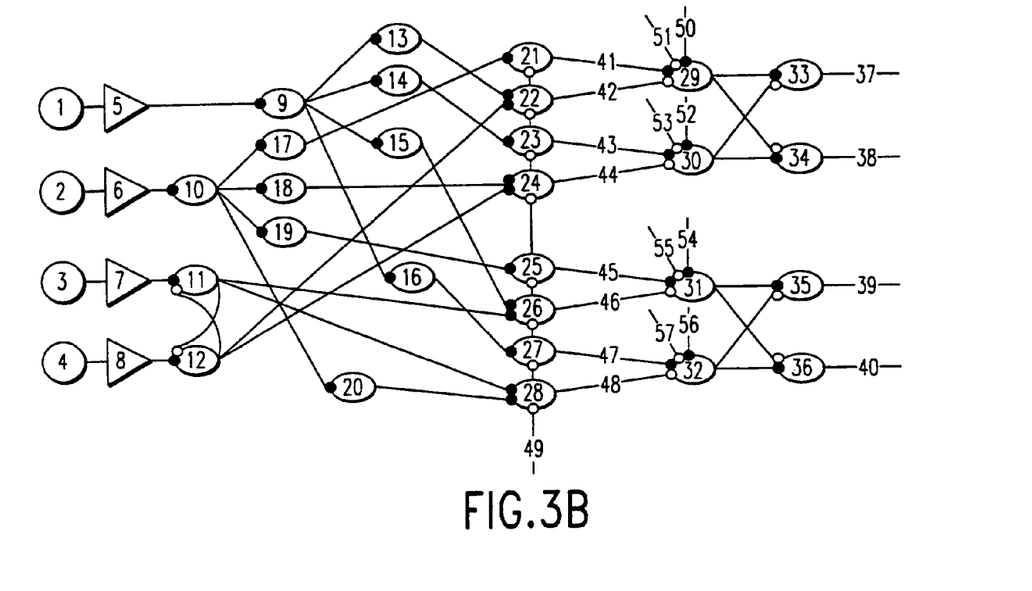
Figure 3C:
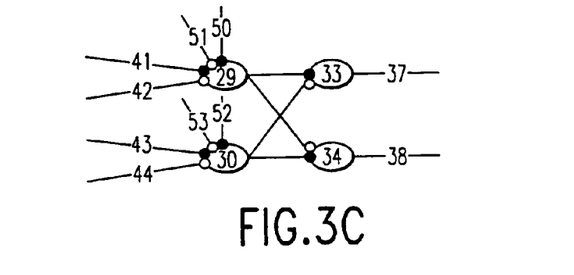

FIG. 3B shows (by way of example) a simplified representation of the collide behaviour and the manifold system in neural notation.

The collision sensors 4 are represented in FIG. 3B as 1, 2, 3 and 4 and are buffered and normalised by sensor pre-processors 5, 6, 7 and 8. The outputs of the sensor pre-processors are each fed into a single neuron 9, 10, 11 and 12 configured as a pulse stretcher with a time constant of approximately 5 seconds. The outputs of these neurons are connected to the rest of the network formed by neurons 13 to 28 where the pattern of connections, and transfer characteristics of the neurons give rise to the behaviour itself. The outputs of this network are connected via the connections 41 to 48 to the manifold summators (generic moderators) 29 to 32 where the signals are summed and the outputs 37 to 40 form the inputs to the left and right motor controllers (not shown in this figure). Connections from another unspecified behaviour (of which there may be many) are shown as 50 to 57. Connection 49 is a subsumption input, which is used to disable the entire behaviour under control of the scheduler software running on a microcontroller or another higher priority neural behaviour. The sensor outputs are also made available to the microcontroller so that high level behaviours such as clutter level estimation may have access to any data produced.

In the event of a direct collision whilst travelling straight ahead the following is true:

The front collision sensor 1 produces a pulse as contact with an obstacle occurs. This pulse is amplified by the sensor pre-processing element 5 and passed to the input neuron 9. This neuron is configured to stretch the width of an input pulse (when that pulse exceeds a predetermined input threshold) to approximately 5 seconds. The output from the input neuron 9 is simultaneously fed to four other neurons 13, 14, 15 and 16. These 'hidden layer' neurons are configured to act as attenuators or in neural terms 'weights', and therefore change the amplitude of the applied signals. Neurons 13 and 15 are set to produce an output level of 10 (maximum) when excited and the outputs are connected to the output neurons 22 and 26 which when excited apply signals to the manifold instructing the motors to stop moving forward. Neurons 14 and 16 are set to produce an output of 5 (half) when excited and their outputs are connected to the output neurons 23 and 27 which when excited apply signals to the manifold instructing the motors to move the robot backwards. This part of the behaviour itself, would theoretically lead to a situation where the robot would repeatedly collide and retreat in a straight line from an obstacle, but inherent inaccuracies in the control system and drive mechanics coupled with the fact that the probability of a perfect head on collision is remote, means that the other collision strategies which involve the left and right sensors, will cause the robot to turn as it reverses from an obstacle and produces a useful behaviour.

The manifold function will now be described in detail with reference to FIG. 3C. The manifold as it's name implies brings together all the output from the robots various neural behaviours, sums it together and provides the inputs to the motor controllers. FIG. 3C shows the section which controls the right hand motor controller; the left had section is identical.

Connection 41 is effectively the 'Go forward right' input and 42 is 'Don't go forward right'. These two opposing inputs are fed into the excitatory and inhibitory inputs of neuron 29. If values of Go forward 6 and don't go forward 3 are applied simultaneously, neuron 29 outputs a value of 3, but if the values are reversed ie. Go forward 3 and don't go forward 6, neuron 29 produces 0. This is most important as it allows a behaviour to inhibit motion in a particular direction without causing motion in the opposite direction.

Neuron 30 performs the same task as 29 except it's inputs are 'Go backwards' 43 and 'Don't go backwards' 44.

Neuron 29 is connected to the excitatory input of 33 which in turn drives the 'Go forward' input of the right hand motor controller via connection 37. Neurons 30 and 34 are connected to the 'Go backward' input of the right hand motor controller via connection 38. The motor controller sums these inputs so that Go forward 8 and Go Backward 4 simultaneously applied on connections 37 and 38 respectively will result in the right wheel rotating forward at a speed of 4.

Neurons 33 and 34 also have inhibitory connections where the forward signal path is connected to the reverse path and vice versa. This allows non-linear behaviour of the manifold and as the strength of these connections is increased, the robot becomes less likely to enter a stable state, where no motion occurs due to behaviours with conflicting interests asserting themselves simultaneously.

Further details of some of the various sensors and their operation will now be given:—

The ultrasound sensor unit 5 has a pre-processor which manages the sensor 13, providing timing pulses etc., and provides the high level behaviour with continuous 'range to target' data and a simple range warning to the reduce speed behaviour module 103. The continuous output is used by the stuck behaviour module 107 which rotates the robot through 360° whilst looking for a clear path down which the robot can escape and is also used by the room size and clutter estimation behaviour modules 109, 108.

To perform the task of dispensing the treatment compositions (for example, a carpet cleaning formulation, known per se, comprising of an aqueous solution of anionic surfactant, optionally together with a polycarboxylate soil suspending agent) on to a surface, it is desirable to know which areas of the surface have already been treated.

A marker agent, added to the formulation in question, has characteristic properties such as absorption or emission of light at a known frequency, or fluorescent behaviour which can be detected by the robot. Examples of such markers are luminol, which can be made to react with hydrogen peroxide to emit light, and substituted coumarins such as 7-hydroxy or 4-methyl-7-hydroxy variants which are highly fluorescent but undergo ring opening reactions to form a non-fluorescent derivative.

For detection purposes, a light source and corresponding photodiode detectors 14, 15, 17 are placed left and right in front of the drive wheels 6,7 of the robot in order to detect said marker chemical and enable the control system to follow the edge of a previous pass. In this manner, a structured dispensing pattern can be established. Moreover, the detector can be linked, via a negative feedback system, to the dispensing array, thereby to avoid the deposition of formulation on to an area of surface that has already been treated. When no area of the floor can be found that has not been treated, the actual time taken is compared with data provided by the estimated room size behaviour module 108, and if the two are within acceptable limits, the treatment of the floor is deemed complete. The characteristic properties by which the marker is detected either decay within 24–48 hours of application (by aerial oxidation or photolytic decomposition) or, in the case of a two stage treatment method, a second chemical may be applied over the first, neutralising the characteristic properties of the marker chemical.

An alternative means of achieving this desired behaviour is to use moisture detection to identify areas of the surface which have already been treated. In this case, the inherent moisture of a liquid formulation is used to detect treated surfaces via moisture sensing arrays which are positioned left and right in front of the drive wheels 6,7 of the robot. Again, this system can be used to enable the robot to follow the edge of a previous pass.

In cases where a hard floor surface is being treated (for example with an aqueous cleaning formulation comprising a mid chain-length non-ionic surfactant with carbonate citrate and caustic soda) the reflective properties of the floor may be used to detect which areas of floor have been treated. A high intensity light source directs light on to the floor where, following reflection, it is subsequently detected by a photodiode detector. These are positioned left and right in front of the drive wheels 6,7 of the robot. Again, this system can be used to enable the robot to follow the edge of a previous pass. In this case, the ability of a formulation to reduce the reflectivity of the floor is harnessed to enable its detection.

What is claimed is:

1. A self-propelled robot configured for movement over a trackless surface to be treated, the robot comprising:
   a power supply;
   a traction mechanism configured to receive power from the power supply and move the robot over a trackless surface;
   a dispense mechanism adapted to controllably deposit a fluent material onto the trackless surface;
   a plurality of navigation sensors providing signals for enabling the robot to navigate over the trackless surface and around obstacles thereon;
   one or more deposition detectors adapted to detect the presence of the fluent material on the trackless surface and provide signals indicative thereof; and a control system configured to receive the signals from the navigation sensors and the one or more deposition detectors and operably dependent upon the signals to control the traction and dispense mechanisms.

2. The robot according to claim 1, wherein the navigation sensors include collision sensors comprising at least one lateral deplacement sensor arranged on a peripheral sensor ring to provide 360° collision detection, one or more vertical displacement sensors, or both.

3. The robot according to claim 1, wherein the detectors comprise one or more detection sensors arranged to detect an edge portion of a previously deposited product.

4. The robot according to claim 1, wherein the deposition detectors include one or more radiation sources, radiation detectors, moisture detectors, reflectivity meters or conductivity meters.

5. The robot according to claim 1, wherein the control system comprises a hierarchical architecture and includes one or more microprocessor controllers or microcontrollers for controlling higher-level functions and providing higher-level instructions; and a plurality of lower-level function modules adapted to receive signals from the navigation sensors and deposition detectors and having processors to provide control signals in response thereto.

6. The robot according to claim 5, wherein signals associated with the traction and dispense mechanisms are issued to a traction mechanism controller and to a dispense mechanism controller, via a manifold, and configured to receive signal inputs from the microprocessors or microcontrollers and from the lower-level function modules.

7. The robot according to claim 5, wherein the lower-level function module processors include neural network functionality to provide behavioral characteristics appropriate to a chosen task of the robot, wherein the behavioral characteristics provided by the processors are moderated by a group of generic moderators providing arbitration between control instructions from the various processors.

8. The robot according to claim 7, wherein the lower-level function modules comprise analog neural networks which provide functions comprising edge follow and dispense control, cliff sensing, collision detection, speed reduction and random movement.

9. The robot according to claim 1, wherein the traction mechanism comprises left and right, coaxially disposed drive wheels having corresponding motors.

10. A method comprising controllably depositing a fluent material onto floors, carpets and other floor coverings using the robot as set forth in claim 1, wherein the robot is autonomous, self-propelled, deposition-sensing and deposition rate-controlling.

11. The method according to claim 10, wherein the deposited material comprises a carpet cleaning composition, an odorization or deodorization composition, a dust mite control composition, an anti-microbial composition, a hard surface cleaning composition, or mixtures thereof, which can be applied simultaneously or successively.

12. The method according to claim 10, wherein the deposited material includes a marker, the presence of which can be detected to provide detection of the extent of treatment of the deposited material.

13. The method according to claim 1, wherein the robot navigates over the trackless surface along an unpredetermined path.

14. A self-propelled robot configured for movement over a trackless surface to be treated, the robot comprising:
a power supply;
a traction mechanism configured to receive power from the power supply and move the robot over a trackless surface;
a dispense mechanism adapted to controllably deposit a fluent material onto the trackless surface;
a plurality of navigation sensors providing signals for enabling the robot to navigate over the trackless surface;
one or more deposition detectors adapted to detect the presence of the fluent material on the trackless surface and provide signals indicative thereof; and
a control system configured to receive the signals from the navigation sensors and the one or more deposition detectors and operably dependent upon the signals to control the traction and dispense mechanisms, wherein the control system comprises a hierarchical architecture and includes one or more microprocessor controllers or microcontrollers for controlling higher-level functions and providing higher-level instructions; and a plurality of lower-level function modules adapted to receive signals from the navigation sensors and deposition detectors and having processors to provide control signals in response thereto, wherein higher-level functions comprise robot impact recognition, room size estimation, clutter level determination and battery monitoring.

* * * * *